(12) United States Patent
Hughes, Jr. et al.

(10) Patent No.: US 7,941,522 B2
(45) Date of Patent: May 10, 2011

(54) APPLICATION SECURITY IN AN INTERACTIVE MEDIA ENVIRONMENT

(75) Inventors: Robert K. Hughes, Jr., Kirkland, WA (US); Yves Arrouye, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 130 days.

(21) Appl. No.: 11/354,800

(22) Filed: Feb. 15, 2006

(65) Prior Publication Data

US 2007/0005758 A1   Jan. 4, 2007

Related U.S. Application Data

(60) Provisional application No. 60/695,944, filed on Jul. 1, 2005.

(51) Int. Cl.
  G06F 17/00       (2006.01)
  G06F 15/16       (2006.01)
(52) U.S. Cl. .............................. 709/224; 726/1; 709/231
(58) Field of Classification Search .................. 709/224, 709/229, 231; 713/176
  See application file for complete search history.

(56) References Cited

U.S. PATENT DOCUMENTS

| | | | |
|---|---|---|---|
| 5,195,092 A | 3/1993 | Wilson et al. | |
| 5,208,745 A | 5/1993 | Quentin et al. | |
| 5,452,435 A | 9/1995 | Malouf et al. | |
| 5,515,490 A | 5/1996 | Buchanan et al. | |
| 5,608,859 A | 3/1997 | Taguchi | |
| 5,631,694 A | 5/1997 | Aggarwal et al. | |
| 5,694,560 A | 12/1997 | Uya et al. | |
| 5,760,780 A | 6/1998 | Larson et al. | |
| 5,794,018 A | 8/1998 | Vrvilo et al. | |
| 5,877,763 A | 3/1999 | Berry | |
| 5,966,121 A | 10/1999 | Hubbell et al. | |
| 5,995,095 A | 11/1999 | Ratakonda | |
| 6,067,638 A | 5/2000 | Benitz et al. | |
| 6,069,633 A | 5/2000 | Apparao et al. | |
| 6,100,881 A | 8/2000 | Gibbons et al. | |
| 6,212,595 B1 * | 4/2001 | Mendel ............................ 711/1 |
| 6,369,830 B1 | 4/2002 | Brunner et al. | |
| 6,384,846 B1 | 5/2002 | Hiroi | |
| 6,426,778 B1 * | 7/2002 | Valdez, Jr. .................... 348/461 |
| 6,430,570 B1 | 8/2002 | Judge et al. | |
| 6,442,658 B1 | 8/2002 | Hunt et al. | |

(Continued)

FOREIGN PATENT DOCUMENTS

CA   2340144 A1   9/2001

(Continued)

OTHER PUBLICATIONS

Non-Final Office Action for U.S. Appl. No. 11/405,736, dated May 18, 2009, 12 pages.

(Continued)

*Primary Examiner* — William C Vaughn, Jr.
*Assistant Examiner* — Joiya M Cloud
(74) *Attorney, Agent, or Firm* — Mayer & Williams PC

(57) ABSTRACT

A security system is described which controls the access of applications to system resources in the field of interactive multimedia. The system establishes a framework for application security, including a signature system, and further provides file formats that support security. Signed applications are afforded high access privileges, while unsigned applications are afforded low access privileges. The combination of signed and unsigned applications on, e.g., a disk, provides for low access privileges for all applications, signed and unsigned.

17 Claims, 3 Drawing Sheets

U.S. PATENT DOCUMENTS

| | | | |
|---|---|---|---|
| 6,453,459 | B1 | 9/2002 | Brodersen et al. |
| 6,505,153 | B1 | 1/2003 | Van Thong et al. |
| 6,577,341 | B1 | 6/2003 | Yamada et al. |
| 6,628,283 | B1 | 9/2003 | Gardner |
| 6,629,150 | B1 | 9/2003 | Huded |
| 6,642,939 | B1 | 11/2003 | Vallone et al. |
| 6,665,835 | B1 | 12/2003 | Gutfreund et al. |
| 6,700,588 | B1 | 3/2004 | MacInnis et al. |
| 6,785,729 | B1* | 8/2004 | Overby et al. ............... 709/229 |
| 6,906,643 | B2 | 6/2005 | Samadani et al. |
| 6,920,613 | B2 | 7/2005 | Dorsey et al. |
| 6,925,499 | B1* | 8/2005 | Chen et al. .................... 709/226 |
| 7,120,859 | B2 | 10/2006 | Wettach |
| 7,131,143 | B1* | 10/2006 | LaMacchia et al. ............ 726/30 |
| 7,200,357 | B2* | 4/2007 | Janik et al. .................. 455/3.02 |
| 7,210,037 | B2* | 4/2007 | Samar .......................... 713/176 |
| 7,222,237 | B2* | 5/2007 | Wuidart et al. .............. 713/176 |
| 7,290,263 | B1 | 10/2007 | Yip et al. |
| 7,496,845 | B2 | 2/2009 | Deutscher et al. |
| 2001/0054180 | A1 | 12/2001 | Atkinson |
| 2001/0056504 | A1 | 12/2001 | Kuznetsov |
| 2001/0056580 | A1 | 12/2001 | Seo et al. |
| 2002/0038257 | A1 | 3/2002 | Joseph et al. |
| 2002/0091837 | A1 | 7/2002 | Baumeister et al. |
| 2002/0099738 | A1 | 7/2002 | Grant |
| 2002/0118220 | A1 | 8/2002 | Lui et al. |
| 2002/0138593 | A1 | 9/2002 | Novak et al. |
| 2002/0157103 | A1 | 10/2002 | Song et al. |
| 2002/0170005 | A1 | 11/2002 | Hayes |
| 2002/0188616 | A1 | 12/2002 | Chinnici et al. |
| 2003/0025599 | A1 | 2/2003 | Monroe |
| 2003/0026398 | A1 | 2/2003 | Duran et al. |
| 2003/0076328 | A1 | 4/2003 | Beda et al. |
| 2003/0142137 | A1 | 7/2003 | Brown |
| 2003/0174160 | A1 | 9/2003 | Deutscher et al. |
| 2003/0182364 | A1 | 9/2003 | Large et al. |
| 2003/0182624 | A1 | 9/2003 | Large |
| 2003/0187801 | A1 | 10/2003 | Chase et al. |
| 2003/0204511 | A1 | 10/2003 | Brundage et al. |
| 2003/0204613 | A1* | 10/2003 | Hudson et al. ................ 709/231 |
| 2003/0210270 | A1 | 11/2003 | Clow |
| 2003/0231863 | A1 | 12/2003 | Eerenberg et al. |
| 2004/0001706 | A1 | 1/2004 | Jung et al. |
| 2004/0027259 | A1 | 2/2004 | Soliman et al. |
| 2004/0034622 | A1* | 2/2004 | Espinoza et al. .................. 707/1 |
| 2004/0034795 | A1 | 2/2004 | Anderson et al. |
| 2004/0039834 | A1* | 2/2004 | Saunders et al. .............. 709/231 |
| 2004/0049793 | A1 | 3/2004 | Chou |
| 2004/0068510 | A1 | 4/2004 | Hayes |
| 2004/0107179 | A1 | 6/2004 | Dalrymple, III |
| 2004/0107401 | A1 | 6/2004 | Sung et al. |
| 2004/0111270 | A1 | 6/2004 | Whitham |
| 2004/0123316 | A1 | 6/2004 | Kendall et al. |
| 2004/0133292 | A1 | 7/2004 | Sakurai et al. |
| 2004/0143823 | A1 | 7/2004 | Wei |
| 2004/0148514 | A1* | 7/2004 | Fee et al. ...................... 713/200 |
| 2004/0153648 | A1* | 8/2004 | Rotholtz et al. .............. 713/176 |
| 2004/0153847 | A1 | 8/2004 | Apte et al. |
| 2004/0156613 | A1* | 8/2004 | Hempel et al. .................. 386/46 |
| 2004/0187157 | A1 | 9/2004 | Chong et al. |
| 2004/0190779 | A1 | 9/2004 | Sarachik et al. |
| 2004/0205478 | A1 | 10/2004 | Lin et al. |
| 2004/0205479 | A1 | 10/2004 | Seaman et al. |
| 2004/0210824 | A1 | 10/2004 | Shoff et al. |
| 2004/0220926 | A1 | 11/2004 | Lamkin et al. |
| 2004/0228618 | A1 | 11/2004 | Yoo et al. |
| 2004/0243927 | A1 | 12/2004 | Chung et al. |
| 2004/0247292 | A1 | 12/2004 | Chung et al. |
| 2004/0250200 | A1 | 12/2004 | Chung et al. |
| 2004/0267952 | A1 | 12/2004 | He et al. |
| 2004/0268224 | A1 | 12/2004 | Balkus |
| 2005/0015815 | A1 | 1/2005 | Shoff et al. |
| 2005/0022116 | A1 | 1/2005 | Bowman et al. |
| 2005/0088420 | A1 | 4/2005 | Dodge et al. |
| 2005/0091574 | A1 | 4/2005 | Maaniitty et al. |
| 2005/0125741 | A1 | 6/2005 | Clow |
| 2005/0132266 | A1 | 6/2005 | Ambrosino et al. |
| 2005/0140694 | A1 | 6/2005 | Subramanian et al. |
| 2005/0149729 | A1* | 7/2005 | Zimmer et al. ............... 713/168 |
| 2005/0183016 | A1 | 8/2005 | Horiuchi et al. |
| 2005/0244146 | A1 | 11/2005 | Tsumagari et al. |
| 2005/0251732 | A1 | 11/2005 | Lamkin et al. |
| 2005/0289348 | A1* | 12/2005 | Joy et al. ....................... 713/172 |
| 2006/0020950 | A1* | 1/2006 | Ladd et al. .................... 719/328 |
| 2006/0041522 | A1 | 2/2006 | Rodriguez-Rivera |
| 2006/0083486 | A1 | 4/2006 | Kanemaru et al. |
| 2006/0269221 | A1 | 11/2006 | Hashimoto et al. |
| 2006/0274612 | A1* | 12/2006 | Kim .......................... 369/30.04 |
| 2007/0002045 | A1 | 1/2007 | Finger et al. |
| 2007/0005757 | A1 | 1/2007 | Finger et al. |
| 2007/0005758 | A1 | 1/2007 | Hughes, Jr. et al. |
| 2007/0006061 | A1 | 1/2007 | Colle et al. |
| 2007/0006063 | A1 | 1/2007 | Jewsbury et al. |
| 2007/0006078 | A1 | 1/2007 | Jewsbury et al. |
| 2007/0006079 | A1 | 1/2007 | Jewsbury et al. |
| 2007/0006080 | A1 | 1/2007 | Finger et al. |
| 2007/0006233 | A1 | 1/2007 | Finger et al. |
| 2007/0006238 | A1 | 1/2007 | Finger et al. |
| 2007/0033419 | A1* | 2/2007 | Kocher et al. ................. 713/193 |
| 2007/0174387 | A1* | 7/2007 | Jania et al. .................... 709/204 |
| 2007/0198834 | A1* | 8/2007 | Ksontini et al. .............. 713/168 |
| 2007/0277245 | A1* | 11/2007 | Goto et al. ....................... 726/27 |
| 2008/0126974 | A1 | 5/2008 | Fawcett et al. |
| 2009/0007160 | A1 | 1/2009 | Wei |

FOREIGN PATENT DOCUMENTS

| | | |
|---|---|---|
| EP | 1345119 | 9/2003 |
| EP | 1345119 A | 9/2003 |
| GB | 2344925 A | 6/2000 |
| WO | WO02/17179 A1 | 2/2002 |
| WO | 02/091178 | 11/2002 |
| WO | 02091178 A | 11/2002 |

OTHER PUBLICATIONS

Non-Final Office Action for U.S. Appl. No. 11/405,736, dated May 1, 2009, 10 pages.

Fritzsche, "Multimedia Building Blocks for Distributed Applications", 1996 International Workshop on Multimedia Software Development (MMSD '96) p. 0041, accessed at http://doi.ieeecomputersociety.org/10.1109/MMSD.1996.557742 on Sep. 30, 2005.

Borchers et al., "Musical Design Patterns: An Example of a Human-Centered Model of Interactive Multimedia", 1997 International Conference on Multimedia Computing and Systems (ICMCS'97) p. 63, accessed at http://doi.ieeecomputersociety.org/10.1109/MMCS.1997.609564 on Sep. 30, 2005.

International Search Report for PCT/US06/23905 of Jun. 20, 2006, 1 page.

Non-Final Office Action for U.S. Appl. No. 11/355,209, dated May 15, 2009, 12 pages.

International Search Report for PCT/US06/23911, mailed on Jun. 3, 2008, 1 page.

International Search Report for PCT/US2006/024155, dated Feb. 26, 2007, 1 page.

International Search Report for PCT/US2006/023906, dated Nov. 20, 2006, 1 page.

International Search Report for PCT/US06/23907, dated Apr. 26, 2007, 1 page.

International Search Report for PCT/US2006/024225, dated Feb. 26, 2006, 1 page.

International Search Report for PCT/US2006/024226 dated Jun. 22, 2006, 1 page.

Non-Final Office Action for U.S. Appl. No. 11/405,737, dated Apr. 30, 2009, 11 pages.

Non-Final Office Action for U.S. Appl. No. 11/352,571, dated May 18, 2009, 9 pages.

Non-Final Office Action for U.S. Appl. No. 11/355,609, dated Jun. 5, 2009, 12 pages.

Non-Final Office Action for U.S. Appl. No. 11/350,595, dated Jun. 26, 2009, 4 pages.

Non-Final Office Action for U.S. Appl. No. 11/351,085, dated Jun. 1, 2009, 14 pages.

Non-Final Office Action for U.S. Appl. No. 11/352,571, dated Apr. 30, 2009, 7 pages.

Cesar et al., "Open Graphical Framework for Interactive TV", IEEE Fifth International Symposium on Multimedia Software Engineering (ISMSE'03) p. 21, accessed at http://doi.ieeecomputersociety.org/10.1109/MMSE.2003.1254418 on Sep. 20, 2005.

Advisory Action for U.S. Appl. No. 11/352,575, dated Jul. 14, 2009, 3 pages.

Final Office Action for U.S. Appl. No. 11/352,575, dated Apr. 28, 2009, 19 pages.

Non-Final Office Action for U.S. Appl. No. 11/352,575, dated Sep. 2, 2008, 15 pages.

Final Office Action for U.S. Appl. No. 11/352,662, dated Jun. 2, 2009, 12 pages.

Anderson et al., "Building multiuser interactive multimedia environments at MERL", Multimedia, IEEE vol. 2, Issue 4, Winter 1995 pp. 77-82, accessed at http://ieeexplore.ieee.org/search/wrapper.jsp?arnumber=482298 on Sep. 30, 2005.

Extended European Search Report Received for EP Application No. 06785212.9, mailed on Mar. 2, 2010, 12 pages.

Apple, Compressor 2 User Manual, Apr. 25, 2005, Apple, select pages (3 in total).

Apple, Final Cut Pro 5 User Manual, May 11, 2005, Apple, select pages (74 in total).

Non Final Office Action for U.S. Appl. No. 11/405,737, dated May 18, 2009, 11 pages.

International Search Report for PCT/US2006/024294 dated Apr. 30, 2007, 7 pages.

International Search Report for PCT/US2006/024423 dated Apr. 24, 2007, 5 pages.

International Search Report for PCT/US2006/024292 dated May 7, 2007, 7 pages.

C. Peng et al., "Digital Television Application Manager", Telecommunications Software and Multimedia Laboratory, Helsinki University of Technology, 2001 IEEE International Conference on Multimedia and Expo, 4 pages.

MHP Project Office: "Digital Video Broadcasting (DVB); Multimedia Home Platform (MHP) Specification 1.1.2", Apr. 25, 2005, part 1A, 405 pages.

MHP Project Office: "Digital Video Broadcasting (DVB); Multimedia Home Platform (MHP) Specification 1.1.2", Apr. 25, 2005, Part 1B, 405 pages.

MHP Project Office: "Digital Video Broadcasting (DVB); Multimedia Home Platform (MHP) Specification 1.1.2", Apr. 25, 2005, part 2, 362 pages.

Final Office Action dated Jan. 22, 2010 in related U.S. Appl. No. 11/350,595. 6 pages.

Final Office Action dated Dec. 11, 2009 in related U.S. Appl. No. 11/355,209, 16 pages.

Evans, Mark, "Lambda the Ultimate" Sep. 7, 2003, DP-COOL 2003 Proceedings, lambda-the-ultimate.org/classic/message8639.html.

Final Office Action dated Dec. 1, 2009 in related U.S. Appl. No. 11/352,571, 9 pages.

Final Office Action dated Nov. 27, 2009 in related U.S. Appl. No. 11/405,737, 12 pages.

Final Office Action dated Jan. 11, 2010 in related U.S. Appl. No. 11/352,662, 13 pages.

Final Office Action dated Dec. 10, 2009 in related U.S. Appl. No. 11/405,736, 14 pages.

Final Office Action dated Jan. 25, 2010 in related U.S. Appl. No. 11/351,085, 14 pages.

International Multimedia Conference; vol. 9 Proceedings of the Ninth ACM International Conference on Multimedia, Poellauer, Schwan, West, pp. 231-240, 2001.

Non-Final Office Action dated Dec. 2, 2009 in related U.S. Appl. No. 11/352,575, 23 pages.

Z-Order Correction Algorithm for Dialog Boxes, IBM Technical Disclosure Bulletin, IBM Corp. New York, US, vol. 37, No. 8, Aug. 1, 1994.

International Search Report for PCT/US06/24292 dated May 7, 2007, 1 page.

Peng et al. "Digital Television Application Manager" 2001 IEEE International Conference on Multimedia and Expo, pp. 685-688.

"International Search Report", International Application No. PCT/US06/24034, Jun. 20, 2008, pp. 10.

* cited by examiner

APPLICATION SECURITY IN AN INTERACTIVE MEDIA ENVIRONMENT

STATEMENT OF RELATED APPLICATION

This application claims the benefit of provisional application No. 60/695,944, filed Jul. 1, 2005, which is incorporated by reference herein.

BACKGROUND

Some multimedia playback systems provide limited interactive graphics during audio/video playback. The greater capabilities of interactive playback systems present greater opportunities for malfeasance. It is critical to maintain the security of the playback system against viruses, spyware and other malicious software. Malicious software could cause the interactive playback system to malfunction or gather and transmit private user information. In addition, an interactive playback system may be connected to a network. The software or user information could propagate from the playback system to other computing systems attached to the network. Consequently, it is critical that the interactive playback system include adequate security provisions.

SUMMARY

A security system is provided which controls the privileges of unsigned applications in the field of interactive multimedia. Interactive multimedia is an environment in which applications typically manage multimedia objects including graphics, audio and video responsively to user input events on a synchronized real-time, frame-accurate basis. Applications here are termed "iHD" applications as they relate to high-definition DVD (digital versatile disk) media. However, the disclosed security system is applicable to other interactive multimedia environments more generally.

The system in particular applies to application security, not content security, and establishes a framework for application security, including a signature system, and further provides file formats that support security. Interactive multimedia applications run on an interactive playback system (that is implemented as a standalone hardware device, or alternatively as a software application running, for example, on a personal computer) may be either signed or unsigned.

Signed applications are allowed practically unlimited applications. Unsigned applications are greatly restricted in what the same can access. Moreover, if both signed and unsigned applications are running, both are given only the security level and access privileges of the unsigned application. Providing for unsigned applications allows for home-authored discs customizable with rich interactivity features, but restricts access to networks, e.g., the Internet, and sensitive information stored within the playback system, to authorized parties.

Signed applications may be provided with special file formats, allowing determination of the signature status without requiring parsing of the entire file.

DETAILED DESCRIPTION

Interactive multimedia applications are those in which the application is responsive to user events. An example is a menu implemented within an application that is accessed by the user, in which the user submits an input that causes the application to change state. In such a case, the interactivity is with the menu graphics which are rendered while video plays beneath them, e.g., on the z=0 layer, on a real time, frame-synchronous basis. The interactivity may lead, for example, to changes in how the video stream is displayed.

For example, an underlying video may be a high-definition movie. The graphic overlay may be part of a commentary by the director of the movie, showing, e.g., a schematic of various camera locations overlayed on top of the scene itself. The user may, employing the remote control, switch to a view envisioned by any of those camera locations.

As noted above, the greater capabilities of interactive playback systems present greater opportunities for malfeasance. Malicious software could cause the playback system to malfunction or gather and transmit private user information.

In the current system, interactive applications for use in the playback system may be either signed or unsigned. Signed applications are those which inherit a root certificate from a trusted root authority (e.g., a movie studio) and are considered safe.

Signed applications are given high-level access privileges. This almost-unrestricted privilege allows access to, e.g., networking, file I/O, security and diagnostic APIs, and may access persistent storage to store and retrieve data that is to persist across invocations of the application.

Unsigned applications, on the other hand, are given low-level access privileges. They are denied access to the type of functionality afforded by high access. They may be limited to the utilization of the markup language, as well as, e.g., certain objects from the following exemplary APIs in ECMAScript: XML (without the I/O functionality); globalization; drawing functions associated with graphics elements; and user input operations.

This level of functionality prohibits access to any networking, security, or file I/O. Any attempt to call a function outside the above namespaces or load resources from persistent local storage may result in an exception which will terminate the application.

Figure 1:
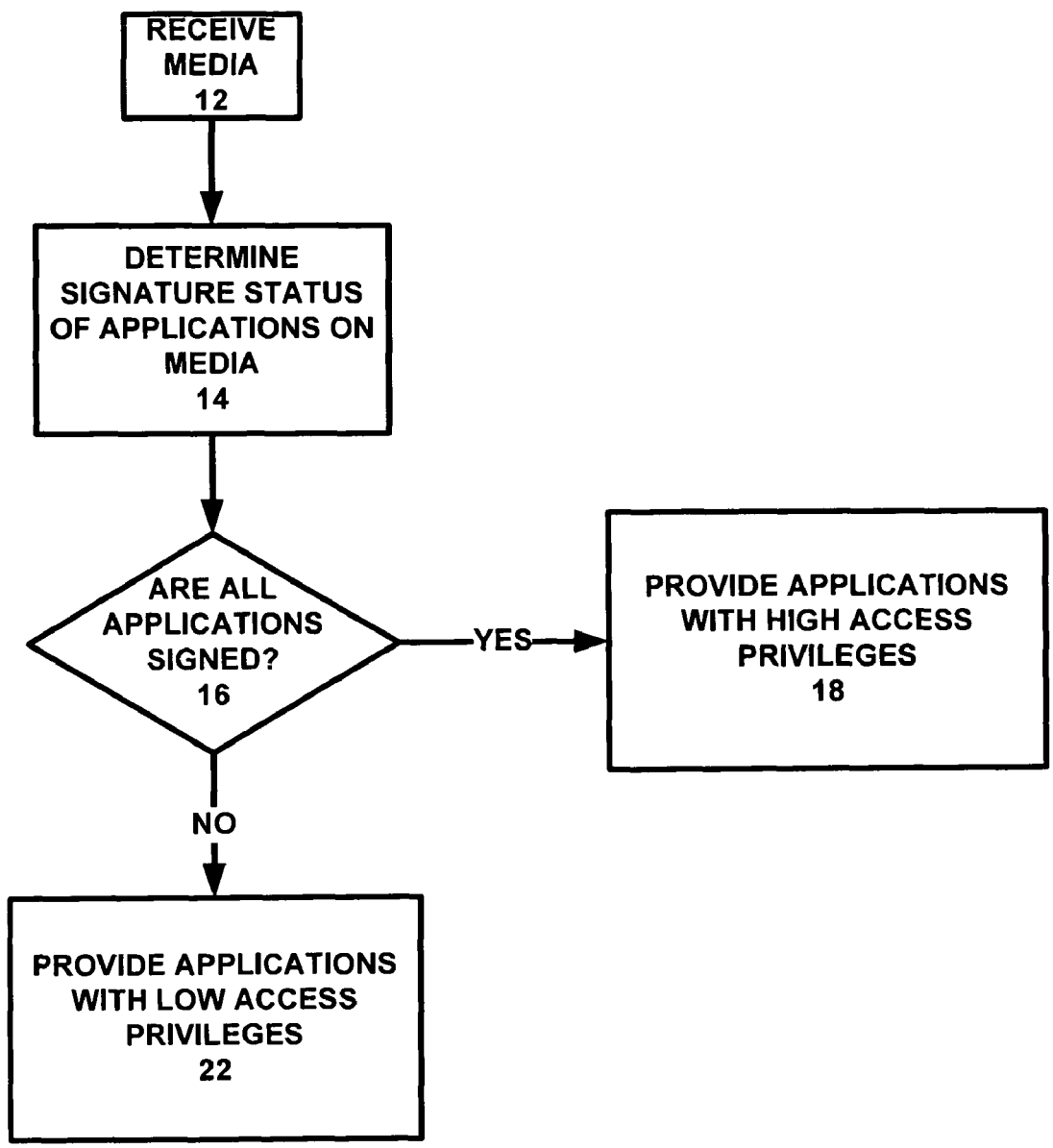
FIG. 1 is a flowchart illustrating a method of assigning privileges to applications where signature statuses of applications are detected from a disk.

In one embodiment, a set of applications is present on a media disk, e.g., a HD-DVD, and the same are employed to run an interactive graphics and video application. Referring to FIG. 1, the media disk is received by the playback system (step 12). The playback system, which may be a general purpose computer system or a more specialized media center system, determines the signature status of the applications on the media (step 14). If the signature status of all applications is determined (step 16) to be signed, then all of the applications are given the high access privileges (step 18). If the signature status of any one application is determined to be unsigned, then all of the applications are given low access privileges (step 22). That is, if an unsigned application is running, all concurrently running applications, whether signed or unsigned, may be restricted to the unsigned application permission level. This prevents an unsigned application from leveraging the privileges of a concurrent signed application.

Figure 2:
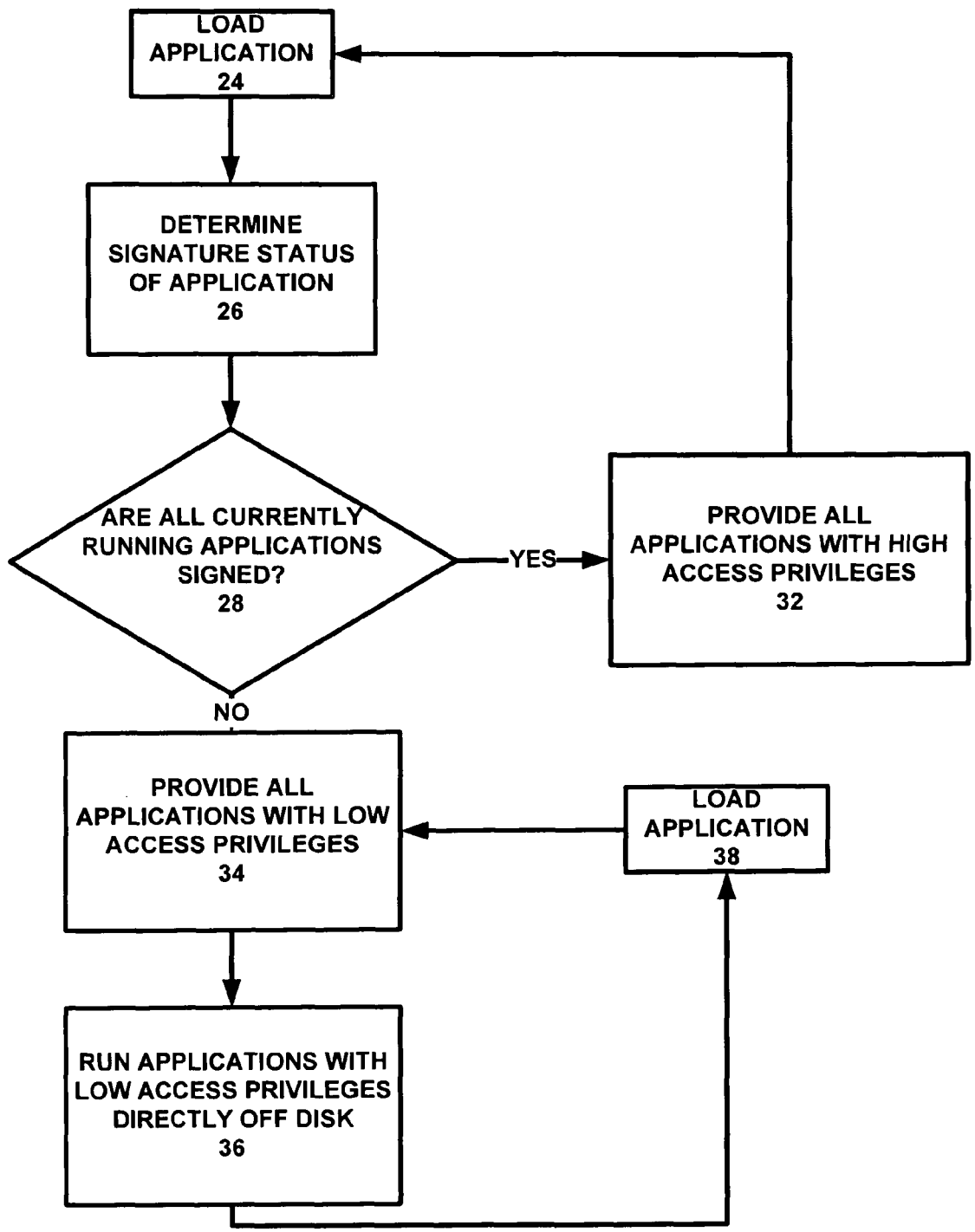
FIG. 2 is a flowchart illustrating a method of assigning privileges to applications where the signature status of an applications is detected upon loading into a playback system.

In another embodiment, a similar method may apply directly to applications loaded into the playback system. Referring to FIG. 2, an application may be loaded into the playback system (step 24). The signature status of the application is then detected (step 26). If the signature status is determined (step 28) to be signed, then the application may be run at a high privilege access level (step 32). However, if the signature status is determined (step 28) to be unsigned, then the application is run at a low privilege access level (step 34). In this case, the application is run directly from the media (step 36), e.g. a disk. This provides enhanced security, as all unsigned applications are then prevented from running or loading resources from local persistent storage of the playback system. If additional applications are loaded (step 38), then they may be tested or not for their signature status: in general, they will be afforded a low access level (step 34). If an application is signed and thus given high access privileges, and then a later application is loaded and is unsigned, then the high access application is lowered to the low-access level.

Figure 3:
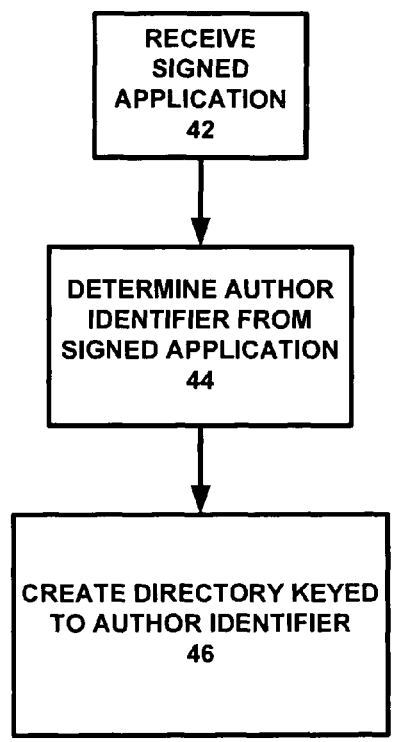
FIG. 3 is a flowchart illustrating creation of an author identifier—keyed directory.

Referring to FIG. 3, for signed applications, the playback system may include employment of a set of author identifiers that are detected (step 44) upon the media introduction (step 42) into the playback system. That is, each media or application may be associated with an author identifier, which uniquely identifies content authors, and which is particularly important to the security of applications in persistent storage, i.e., those which can access persistent storage to store and retrieve data that are desired to be persistent across invocations.

The author identifier is then associated with creation (step 46) of a directory associated with that author identifier. The application from that media may access only the directory corresponding to its author identifier in persistent storage. The file system, as the application views it, is rooted in that directory. While the application can manage subdirectories, it cannot go above its root directory and see other author's data.

The author identifier may be associated with either a disk, including all the applications on that disk, or a single application, either on that disk, spread over several disks, or otherwise loaded into the playback system, e.g., via an internet download. Furthermore, a given media may be associated with a single author identifier, but a given author identifier may be found on multiple media. Another embodiment may be to use the identifier referred to by the key that signed the application. Assuming that different applications may be signed by different persons on a single media, this embodiment would lead to even greater segregation of storage. Using the chain of certificates instead of the last signature would do so even more.

Application Structure

Figure 4:
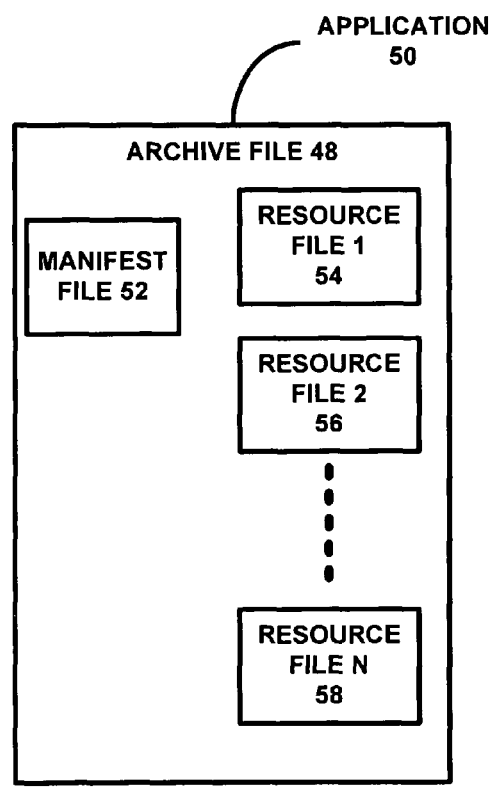
FIG. 4 is a schematic depiction of an application file.

The structure of a signed application is now described. Referring to FIG. 4, a signed application 50 may include a manifest file 52 and at least one resource file 54. The manifest file 52 is signed with the author's signature and certificate and authenticates all the resources it references.

The application may have its manifest file 52 and all resource files 54-58 bundled into an uncompressed archive 48. An application may be converted into an archive file format having a manifest file and at least one resource file. The file format for archive 48 need not even support encryption. The archive file 48 is in essence a container and generally does not need to be signed independently. The manifest file 52 may reference each of the resource files 54-58 of the interactive application. The archive 48 architecture may be specified such that the archive 48 may be streamed efficiently, e.g., the signed manifest file 52 may be the first file within the archive 48, allowing the verification of the signature without reading the entire archive. Subsequent versions of the archive format may be backwards compatible with previous ones.

Authentication of the data in the archive 48 may be provided by the use of, e.g., XML-Signature as defined by RFC 3275.

Manifest File Format

In one example, the format of the signed manifest file 52 may make use of a subset of the W3C Recommendation for XML-Signature Syntax and Processing defined by RFC 3275. In this way, the following subset of elements may be included and supported:

ds:Signature
ds:SignatureValue
ds:SignatureType
ds:Reference
ds:Reference/ds:DigestValue Other elements may be determined by the system. Digest values for each resource item included in the manifest may be listed as ds:Reference elements.

Certificates and Signatures

As an example, the required certificate type may be, e.g., X.509. The signature method as defined by ds:SignatureMethod may be RSA-SHA1. The canonicalization method may be specified to be Exclusive XML Canonicalization 1.0. The digest method may be the same as the signature method, RSA-SHA1. The key information may be inferred by the system from the identity of the media or local storage area from which the application is being run.

Certificate Revocation Lists

To provide a mechanism for revocation and replacement of compromised applications, each interactive video and graphics application author can include a Content Revocation List ("CRL") which lists the bundle file digest values of revoked applications. This CRL may be included in a separate file. This file contains a list of bundle signature digests which have been revoked, and the signature of the content creator who authored the disc. Assuming that the original author's signature of each revoked application matches that of the signature in the CRL file, the application digests listed will be stored in the content provider's restricted area of local storage and will be no longer allowed to run. If a CRL is included in an application, it may be given a recognizable name such as Revocation.xml.

The application author may desire to replace the revoked application with a new version. This can be accomplished in several different ways. Titles running on Internet-connected players may be caused to check their home servers for updated playlists or interactive video and graphics bundles which specify newly downloaded applications. Alternatively, the media revoking an application could also supply the replacement itself.

The following table describes one possible format of the archive file, along with comments describing the fields. It should be noted that numerous other formats may be used. In this table, abbreviations are used to represent types: Uin represents a unsigned integer of n bits. For example, Ui8 is an 8-bit unsigned integer, and Ui32 is a 32-bit one. An array of type is indicated by using square brackets, and the length of the array is indicated in between those brackets. If the length depends on a previous field, that field's name, or a shorter name indicated in the field, can be used to refer to the value of that field. Hexadecimal values are indicated using the 0xdd notation. All variable-length strings, and hence resource names, may be encoded using UTF-8 using a Pascal string notation (8-bit length followed by bytes).

| | Field | | Type | Comment |
|---|---|---|---|---|
| Archive Header | Magic | | Ui8[5] | The values of the 5 bytes must be: 0x69, 0x48, 0x44, 0x61, 0x72. |
| | Version | | Ui8 | Version of the format. The value must be 0x01. |
| Resource Catalog | Resource Entry #1 | Resource Entry Length | Ui16 | Length of this resource entry. |
| | | Resource Offset | Ui32 | Byte offset of the resource in the resource data block. |
| | | Resource Length | Ui32 | Length of the resource in bytes. |
| | | Resource Checksum | Ui32 | CRC-32 checksum of the resource bytes. |
| | | Resource Type Resource Name Length | Ui8 | RNL |
| | | Resource Name | Ui8[RNL] | The filesystem name of the resource. |
| | ... | ... | ... | ... |
| | Resource Entry #n | Resource Entry Length | Ui16 | Length of this resource entry. |
| | | Resource Offset | Ui32 | Byte offset of the resource in the resource data block. |
| | | Resource Length | Ui32 | Length of the resource in bytes. |
| | | Resource Checksum | Ui32 | CRC-32 checksum of the resource bytes. |
| | | Resource Type Resource Name Length | Ui8 | RNL |
| | | Resource Name | Ui8[RNL] | The filesystem name of the resource. |
| Resource Data Block | | | | All the resource data, in continuous blocks. |

Certain rules may apply to the application resources noted above. For example, resource names must be file system names or logical URIs. The directory in which an archive file will be extracted may be considered to be the root of the file system during that extraction. In that way, all names will be made relative to that directory, so that absolute paths will behave the same as relative ones. If a name results in a location outside of that directory, the name and the entry may be considered invalid.

The following sections give more detailed information about various fields and sections of the above exemplary archive file.

Archive Header
Magic Field

This is a "magic number" used to uniquely identify archives. It may consist of the string "iHDar", i.e., iHD archive, coded as a sequence of 5-character values in UTF-8, ASCII, etc., i.e. 0x69, 0x48, 0x44, 0x61, 0x72.

Version Field

The version field allows an archive reader to read different versions of the archive format. By looking at the version field, one can know what to expect in the different sections of the file, and thus read information that was not present in some versions of the file format. The value of this field may be, e.g., 0x01. Future versions may have values from 0x02 to 0xff.

Resource Catalog and Resource Entries

The resource catalog includes a number of resource entries. Each entry follows the same format.

Resource Entry Length

This is the length, in bytes, of the resource entry itself. This value is used by readers who are reading a format whose version they do not understand. Assuming that an archive written using version 2 of the format is seen by a reader made for version 1, the reader can read the fields it knows about and then skip to the next resource entry since it knows the length of the current entry.

Resource Offset

This indicates the byte offset of the resource in the resource data block. The offset of the first resource is 0x0000.

Resource Length

This is the length of the resource, in bytes.

If resources A and B are contiguous in the archive file, then the resource offset for B is equal to the sum of A's resource offset and resource length.

Resource Checksum

This represents a CRC-32 checksum of the resource, as defined by ISO 3309. Note that this checksum should only be used for simple verification of the integrity of a resource transported over an unreliable medium. Because the CRC-32 checksum is neither keyed nor collision-proof, it should not be used for authentication purposes. If one needs to authenticate resources, the signature mechanism described above may be employed.

Resource Type

This is the MIME type of the resource.

Resource Name Length

This is the length of the resource name in bytes. The resource name immediately follows this field.

Resource Name

This is the resource name itself.

Resource Data Block

The resource data block contains all the bytes for the resources, in the order they appear in the resource catalog.

There is generally no explicit separation between two resources, as their offsets and lengths are well-known quantities.

The system may be described in the general context of computer-executable instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The instructions which execute the method and system may be stored on a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Although described in connection with an exemplary computing system environment, including a computer, the system is operational with numerous other general purpose or special purpose computing system environments or configurations. The computing system environment is not intended to suggest any limitation as to the scope of use or functionality. Moreover, the computing system environment should not be interpreted as having any dependency or requirement relating to any one or combination of components illustrated in the exemplary operating environment. Examples of well known computing systems, environments, and/or configurations that may be suitable that may be used include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The systems and methods described herein may be implemented in software or hardware or both using techniques some of which are well known in the art.

The order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of the invention, it is intended that all matter contained in the above description shall be interpreted as illustrative and not in a limiting sense.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for ensuring security of an application in an interactive multimedia environment, comprising:
   a. receiving an application comprising instructions for synchronously managing graphics, audio, and video multimedia objects responsively to user input, the instructions not executable to implement a security policy for the application;
   b. detecting whether the application has an associated digital signature, wherein the detecting comprises reading a manifest file associated with the application, and determining if the manifest is signed with an author's signature and certificate;
   c. if a valid digital signature associated with the application is detected, then executing the application by a processor associated with a multimedia player to synchronously manage graphics, audio, and video multimedia objects responsively to user input events, execution of the application resulting in the application having access to a source of local storage of the multimedia player and a network resource;
   d. if a valid digital signature associated with the application is not detected, then executing the application by a processor associated with a multimedia player to synchronously manage graphics, audio, and video multimedia objects responsively to user input events, while prohibiting the executing application from accessing a source of local storage of the multimedia player and a network resource;
   e. receiving another application;
   f. detecting whether the other application has an associated digital signature; and
   g. if either a valid digital signature associated with the application or a valid digital signature associated with the other application is not detected, then denying permission for both applications to access both a source of local storage and a network resource of the multimedia player; or
   h. if both a valid digital signature associated with the application and a valid digital signature associated with the other application are detected, then granting permission for both applications to access both a source of local storage and a network resource.

2. The method of claim 1, further comprising if a valid digital signature associated with the application is detected, then giving the executing application permission access to file I/O and security and diagnostic APIs associated with the multimedia player.

3. The method of claim 1, wherein the application includes an archive which houses the manifest file and at least one resource file, and wherein the manifest file is the first file in the archive.

4. The method of claim 3, wherein the archive has a format such that the archive may be streamed efficiently.

5. The method of claim 1, further comprising if a valid digital signature associated with the application is detected, then the application includes a signed root certificate, a content revocation list, or an author identifier.

6. The method of claim 1, wherein the source of local storage is a directory keyed to the author identifier.

7. The method of claim 1, further comprising if a valid digital signature associated with the application is detected, then prohibiting the executing application from accessing a source of local storage of the multimedia player comprises denying permission access to file I/O and security and diagnostic APIs associated with the multimedia player.

8. The method of claim 1, further comprising if a valid digital signature associated with the application is not detected, then giving permission access to utilization of a markup language and utilization of the objects consisting of: XML without I/O functionality, globalization, drawing functions, and user input operations.

9. The method of claim 1, further comprising if a valid digital signature associated with the application is not detected, and the application is received from an optical disk, then running the application only from the optical disk.

10. A multimedia playback system for applications comprising instructions for synchronously managing graphics, audio, and video multimedia objects responsively to user input events, the instructions not executable to implement a security policy for the applications, comprising:
a network resource;
a source of local storage;
a device to receive at least a first application;
a processor to detect whether any received application has an associated digital signature;
wherein if only a first application is received, and if a valid digital signature associated with the first application is detected, then executing the application by a processor associated with a multimedia player to synchronously manage graphics, audio, and video multimedia objects responsively to user input events, execution of the first application resulting in the first application having access to a source of local storage of the multimedia player and a network resource;
wherein if only a first application is received, and if a valid digital signature associated with the first application is not detected, then executing the first application by a processor associated with a multimedia player to synchronously manage graphics, audio, and video multimedia objects responsively to user input events, while prohibiting the executing application from accessing a source of local storage of the multimedia player and a network resource;
wherein if a valid digital signature associated with the first application and a valid digital signature associated with a second application are detected, wherein the detecting comprises reading a manifest file associated with the application, and determining if the manifest is signed with an author's signature and certificate, the first application and the second application are executed by the processor to synchronously manage graphics, audio, and video multimedia objects responsively to user events, and both the first application and the second application are given permission to access the source of local storage and the network resource; and
wherein if a valid digital signature associated with the first application or a valid digital signature associated with the second application is not detected, the first application and the second application are executed by the processor to synchronously manage graphics, audio, and video multimedia objects responsively to user events, but denied permission to access the source of local storage and the network resource.

11. The system of claim 10, wherein the processor detects whether the first application and the second application each have an associated digital signature by reading a manifest file associated with the application, and determining if the manifest is signed with the author's signature and certificate.

12. The system of claim 11, wherein the first application and the second application each contain an archive which houses the manifest file and at least one resource file, and wherein the manifest file is the first file in the archive.

13. The system of claim 10, wherein if the signature status is signed, then the first application and the second application each include a signed root certificate, a content revocation list, or an author identifier.

14. The system of claim 13, wherein the source of local storage is a directory keyed to the author identifier.

15. The system of claim 10, wherein if a valid digital signature associated with the first application and a valid digital signature associated with the second application are each detected, then the first application and the second application are each given permission access to file I/O and security and diagnostic APIs.

16. The system of claim 10, wherein if a valid digital signature associated with the first application or with the second application is not detected, then the first and second applications are:
a. denied permission access to file I/O and security and diagnostic APIs; or
b. given permission access to utilization of a markup language and utilization of the objects consisting of: XML without I/O functionality, globalization, drawing functions, and user input operations.

17. The method according to claim 1, wherein the step of receiving an application comprises receiving an application via a media disk readable by the multimedia player.

* * * * *